United States Patent [19]
Loh et al.

[11] Patent Number: 5,185,175
[45] Date of Patent: Feb. 9, 1993

[54] PROCESS FOR MAKING A MICROMILLED COCOA COMPOSITION AND A MICROMILLED COCOA COMPOSITION

[75] Inventors: Jimbay Loh, Peekskill; Jerome Trumbetas, Tarrytown; David H. Palmer, Selden; Mark D. Fitch, Stonybrook, all of N.Y.

[73] Assignee: Kraft General Foods, Inc., Northfield, Ill.

[21] Appl. No.: 747,815

[22] Filed: Aug. 20, 1991

[51] Int. Cl.$^5$ ................................................ A23G 3/00
[52] U.S. Cl. ...................................... 426/631; 426/659
[58] Field of Search ...................... 426/659, 631, 593

[56] References Cited

U.S. PATENT DOCUMENTS

| | | | |
|---|---|---|---|
| 3,462,279 | 8/1969 | Vospalek | 426/659 |
| 3,472,658 | 10/1969 | Isaacs | 426/593 |
| 3,656,971 | 4/1972 | Reimer | 426/659 |
| 3,784,713 | 1/1974 | Colten | 426/659 |
| 3,955,008 | 5/1976 | Hanamoto | 426/659 |
| 3,959,516 | 5/1976 | Warkentin | 426/659 |
| 4,232,049 | 11/1980 | Blake | 426/616 |
| 4,713,256 | 12/1987 | Chaveron | 426/631 |
| 4,758,444 | 7/1988 | Terauchi | 426/593 |
| 4,761,292 | 8/1988 | Augustine | 426/659 |
| 5,011,704 | 4/1991 | Smagula | 426/659 |

OTHER PUBLICATIONS

Minifie 1980 Chocolate, Cocoa and Confectionery: Science and Technology 2nd ed. pp. 105-127.

*Primary Examiner*—Carolyn Paden
*Attorney, Agent, or Firm*—Linn I. Grim

[57] ABSTRACT

Disclosed are compositions and methods of making an aqueous sugar dispersion of microparticalized cocoa, used to modify chocolate products such as low-fat icings, frostings, among other products.

24 Claims, No Drawings

PROCESS FOR MAKING A MICROMILLED COCOA COMPOSITION AND A MICROMILLED COCOA COMPOSITION

TECHNICAL FIELD

The present invention relates to chocolate food products which have been modified in their properties by the inclusion of an aqueous sugar solution of micro-particularized cocoa. The modified properties include a fat-like mouthfeel, a flavor profile which resembles refined chocolate, better color, viscosity control, and stabilization. Additionally, the invention relates to methods of making the aqueous sugar/cocoa dispersion and incorporating the dispersion in chocolate products.

DESCRIPTION OF THE PRIOR ART

The food art is replete with disclosures of food modifiers, particularly as substitutes for fat, which disclose small particles of a carbohydrate or protein material which serves to simulate the water-in-oil emulsion properties of a fat or cream.

German Patent Application 2345806 (published Mar. 20, 1975) discloses fine grinding of a bran, such as wheat, corn, rice and barley to a particle size between 0 and 50 microns, preferably 0 to 20 microns, and then using such product as a filler in low calorie foods.

U.S. Pat. Nos. 4,143,174 and 4,209,503 to Shah et al. show colloidal protein particles having an average particle size of less than 10 microns, preferably less than 5 microns, being used as a food modifier for stability, thickening, clouding, gelling and viscosity control purposes.

U.S. Pat. No. 3,023,104 to Battista discloses microcrystalline cellulose at 1 to 300 microns, preferably 1 micron, as a fat substitute. Tiemstra (U.S. Pat. No. 3,573,058) adds a hydrocolloid, such as sodium alginate to Battista's product to improve its storage stability.

U.S. Pat. No. 4,103,037 to Bodor et al. disclose small particles of protein (below 5 microns) in a low fat spread. In a later patent (U.S. Pat. No. 4,591,507), Bodor et al. use hydrated starch, from corn, wheat, oats and rice, as a partial fat replacement in margarine to improve the stability and spattering behavior of the margarine. Small particles of hydrated rice starch (8 to 15 microns after swelling) are used for this purpose in margarine.

U.S. Pat. No. 4,305,964 to Moran et al. shows gelled water beads at 5 to 10 microns, preferably coated with a layer of oil, in an artificial cream. Gelled spheres containing hydrocolloid at 10 to 20 microns are shown by Moran et al. (U.S. Pat. No. 4,305,970), as well as fine fat particles at 0.1 to 2 microns in a dispersed phase of 10 to 40 microns (U.S. Pat. No. 4,515,825).

U.S. Pat. No. 4,734,287 to Singer et al. discloses coagulated proteins under heat and shear conditions shaped into spheroidal particles of 0.1 to 2 microns to create the creamy mouthfeel characteristic of fats and oils. This same technique is shown in Singer et al.'s later patent (U.S. Pat. No. 4,911,946) applied to any carbohydrate (starches, gums, cellulose) to achieve this same creamy mouthfeel.

None of the above patents discloses or suggests the micromilling of cocoa. However, a "Dyno-Mill" sales brochure (published June 1986) by Glen Mills Inc. of Maywood, New Jersey discloses that the "Dyno-Mill" machine can be used for extremely fine (0.1 micron) wet milling of various food ingredients. Ingredients such as chocolate sauce, imitation chocolate, nut cream, fat/sugar mixtures, soya flour, coffee, flavoring, etc. are disclosed.

Cocoa can be milled at water levels above 70%, but the micromilled cocoa cannot be used in bakery applications due to its high water content. Bakery products require a moisture content in the micromilled cocoa of below 50%, typically about 25 to 35%. However, at these low water levels the Dyno-Mill does not operate due to seizing of the machine.

It would be desirable if a new form of microparticularized cocoa paste could be produced having a low water content, low fat and improved flavor.

It would be desirable to produce a microparticularized cocoa paste having an intense chocolate flavor similar to "conched" chocolate. ("Conching" is the kneading and stirring of a warm cocoa mass over 6-38 hours to develop fine chocolate flavor to its optimum.)

Thus, an aspect of this invention is to drastically improve various functional characteristics of chocolate products, particularly bakery products that normally contain chocolate.

Another aspect of this invention is to produce virtually fat free (less than 1%) chocolate bakery products, such as 99% fat-free icings and frostings.

A further aspect of this invention is that chocolate products, whether they contain their full complement of fat, or are reduced in fat content, could be given new functional properties such as better chocolate flavor, better color, better thickening, and better stability.

SUMMARY OF THE INVENTION

This invention is founded on the discovery that new functional properties can be given to a wide array of chocolate products by incorporating an aqueous sugar paste containing microparticles of cocoa dispersed in the paste. The colloid-like cocoa paste has improved food modifying properties of intense chocolate flavor similar to "conched" chocolate, fat-like mouthfeel, thickener, viscosity control, and stability. The paste comprises hydrated microparticles of cocoa having a particle size of about 0.1 to 20 microns, preferably about 0.1 to 10 microns, and an average mean particle size of about 2 to 7 microns. The hydrated microparticles of cocoa are dispersed uniformly throughout an aqueous sugar paste. The paste has an Aw (water activity) of 0.80 to 0.90, preferably 0.84 to 0.88 and most preferably about 0.86. The extended shelf stability of the paste enables the product to be distributed and sold as a food modifier.

The paste can be made from commercial cocoa powder which has an average particle size of about 75 microns by forming a slurry of 10-30% (by wt.) cocoa, 15-75% sugar, and 20-55% water, said sugar and water being present in the slurry as a 15 to 75% sugar solution, grinding the cocoa particles in the slurry to a particle size wherein 100% of the particles are between about 0.1 to 20 microns, preferably about 0.1 to 10 microns, and an average mean particle size of 2-7 microns thus forming a micromilled cocoa paste. The paste can then be added to a chocolate bakery product in an amount effective to modify the functional properties of the product.

The aqueous liquid may simply be water, but is preferably water which contains a protein material. Skim milk, low fat milk, or condensed skim milk are suitable aqueous liquids which contain protein. If fat-reduction is not important, whole milk or milk which contains fat may be used. Of course, milk solids, such as non-fat milk solids, skim milk solids, casein gelatin, egg whites, or soy protein may be added to the aqueous liquid to provide the protein source. Any edible protein containing material may be added.

DETAILED DESCRIPTION OF THE INVENTION

The paste is characterized by the following particle size distribution for the cocoa particles which are dispersed in the aqueous sugar paste.

| Microns | % By Weight |
|---|---|
| <2 | 5-25% |
| <10 | 80-95% |
| >10<20 | 5-20% |

Typically, less than 20% of the particles are between 10 and 20 microns, less than 25% are between 0.1 and 2 microns, and at least 75% are between 2 and 10 microns.

While the above particle size distribution is effective to give the food-modifying results of this invention, it is preferred that 100% of the cocoa particles be reduced to a size of between about 0.1 and 10 microns. This size gives the best results relative to a mouthfeel which approaches fat-like properties and a "conched" chocolate flavor.

Commercial cocoa powder at an average particle size of above 20 microns and typically 75 microns can be wet-milled in the presence of sugar and water in a "Dyno-Mill". Any cocoa powder can be used ranging in fat content from about 0.1 to 26% fat. The Dyno-Mills are manufactured by Willy A. Bachofen AG and can be obtained in the United States through Glen Mills Inc., 203 Brookdale Street, Maywood, N.J. 07607. The Dyno-Mill grinds the food ingredient in a liquid base (15-75% aqueous sugar syrup) to an extremely fine particle size and disperses the finely ground particles within the liquid medium into a homogenous paste. The cocoa sugar-water slurry to be processed is pumped through a horizontal chamber containing ceramic (zirconium oxide) beads at 1.7 to 2.0 mm. An agitation shaft with rotor discs moves the beads at great speed impacting them millions of times against the process solids. The shearing forces generated by this action reduce the cocoa solids to between about 0.1 and 20 microns with 75 to 80% of the cocoa particles between about 2 and 10 microns. This creates a uniform dispersion of the small particles in the sugar-water paste. The paste is discharged continuously while the beads are retained in the Dyno Mill by a "dynamic separator" which forms an adjustable gap that holds the ceramic beads in the machine while allowing the cocoa paste to exit.

Efforts to wet-mill the cocoa with a liquid base of 35-65% water or roughly below a 1:2 ratio of cocoa:water met with no success due to seizing of the Dyno-Mill. The strong water absorption characteristics of the cocoa absorb all the water present to form a viscous mass which cannot be ground. This problem can be solved employing sufficient sugar in the water base to have a 15-75% sugar solution. The sugar syrup thus prevents the water from being absorbed by the cocoa during the wet-milling operation and results in a unique paste being produced which has many varied and desired functional properties.

The range of ingredients for forming the slurry which is pumped to the Dyno Mill is 10-30% (by wt.) for the cocoa, 15-75% for the sugar and 20-55% for the water. A preferable range is 20-25% (by wt.) cocoa, 40-50% sugar, and 25-35% water. The ratio for the sugar:water mixtures in parts by weight is between 1:2 and 3:1, with between 2:1.5 and 2.5:1.5 being preferred.

The aqueous liquid may be milk or any other protein containing aqueous liquid. In the case where fat reduction is not important to the end product, the milk may be whole milk or dry whole milk solids. In most cases fat reduction is important, so it is preferable to use milk having a reduced fat content, such as skim milk, low fat milk, condensed skim milk, or non-fat milk solids. When dry milk solids, preferably low fat milk solids, are added to the aqueous liquid, it may be used at about 0.5 to 10% level, preferably about 1-5%, and most preferably 1-3%. Instead of milk solids, casein, gelatin, egg white or soy protein may be used.

The wet-milled paste of sugar, water and micromilled cocoa has truly unexpected functional properties never before observed in a sugar/water paste of cocoa particles having a size above 20 microns. The consistency of the paste material is altered drastically so that it has unusual thickening properties. The flavor profile changes unexpectedly to a refined chocolate flavor similar to that achieved by "conching" cocoa with cocoa butter. Unexpectedly, the mouthfeel of the paste is vastly improved giving the perception and sensation of chocolate products which contain a high level of cocoa fat-like or cream-like. Moreover, the paste is exceedingly stable to various storage conditions. The paste remains soft (spoonable) under freezer conditions. Ice crystal growth under freezer temperatures is prevented. Crystallization of sugar is inhibited. The paste has increased hydrophobicity and will not dissipate in an aqueous system unless mechanical force is used. If the particles are dispersed in an aqueous system, they will remain suspended and will not settle.

The paste is particularly useful in formulating low fat, or no fat chocolate flavored cakes and bakery products to give a full fat eating quality to the product. These cakes and bakery products have a moisture content below 45% and an Aw of 0.86 to 0.89. A paste having a moisture content above 50% or an Aw above 0.90 cannot be added to most baked products. A paste having an Aw of below 0.80 cannot be added to most baked products. However, for baked products such as cookies Aw below 0.80, say 0.75-0.80 can be used. The micromilled cocoa particles are transformed from an inert particle into a fat-like material which imparts a creamy, smooth mouthfeel to the product. The paste also provides a darker color, increased viscosity and much better flavor release.

An immediate commercial application of the micromilled cocoa paste is the area of low fat and no fat icings for cakes. Essentially, the icings are fat systems that are sweetened with sugar. The icings are made low fat by removal of the fat leaving a sugar water emulsion which must be thickened with gum or starch. Obviously, this leaves a stringy, thick icing devoid of any fat-like properties. Moreover, these commercial low-fat icings still have 5-10% fat, typically 6% fat.

Addition of the micromilled cocoa paste of this invention to these low fat icings will drastically improve the mouthfeel close to a full-fat counterpart. The paste may be added in the range of 10-50% while a preferred range is 20-30% of the total icing.

A suitable no-fat icing having less than 1% fat using the micromilled cocoa paste can be made from the following starch base icing formula:

| Ingredient | % Range | Preferred % |
|---|---|---|
| water | 25–50 | 30–40 |
| sugar | 45–70 | 52–62 |
| starch | 5–10 | 6–8 |
| gum | 0.05–0.3 | 0.15–0.25 |
| salt | 0.2–0.4 | 0.3–0.4 |
| preservative | 0.1–0.2 | 0.1–0.2 |
| color | — | — |

The only essential ingredients for the icing are the starch and the sugar. The starch may be any uncooked starch, including tapioca, wheat or corn starch. The sugar is sucrose, invert sugar or a combination of invert and sucrose. The gum ingredient can be any hydrocolloid gum. Agar agar, gelatin, locust beam gum, or carrageenan are preferred with agar agar most preferred. Any food approved preservative, including sorbate can be used. Any food approved color, including titanium dioxide may be used. The finished icing has an Aw of 0.84 to 0.88, preferably 0.85 to 0.86 and can be easily combined with a cake having an Aw of 0.86 to 0.88 with superior stability results at the interface. Aside from icings and frostings, chocolate baked goods having desirable texture and organoleptic characteristics may be prepared using the aqueous cocoa/sugar dispersion of this invention. Baked goods typically utilize substantial quantities of triglycerides. These triglycerides such as butter and shortenings have high caloric content. Consumers, for various reasons, may wish to reduce their triglyceride intake. The dispersion is a particularly desirable component of baked goods having a reduced fat content, such as low-fat cake batters, cookies, chocolate chips and brownies. The dispersion of this invention will be utilized at a level of from about 10 to 80% by weight. Of course, the paste dispersion may also be used in addition to the full shortening component and still give new functional properties to the product.

The dispersion of this invention is also directed to reduced fat, and no-fat candies and confections having increased nutritional balance and novel organoleptic and mouthfeel characteristics. The dispersion is an important component of low fat, or no fat chocolate having desirable organoleptic characteristics. Confections are characteristically comprised primarily of sugars. By sugars is meant nutritive sugars such as nutritive mono, di and poly-saccharides such as sucrose, dextrose, levulose and starch syrups such as sucrose, dextrose, levulose and starch syrups such as corn syrups of varying composition including dextrin, maltose and dextrose, and low caloric sweeteners such as polyglucose, xylitol, as well as artificial sweetener agents such as saccharine and aspartame. Typically about 10 to 80% by weight of the dispersion composition of this invention may be used in confections.

The cocoa/sugar/water paste may be dried to a powder by drum-drying or spray-drying. Typically, a cocoa:sugar:water ratio of 15:60:25 was micromilled with an ingredient which will aid dispersion and hydration after drying. Lecithin can be used for this purpose at a level (dry basis) of 0.01 to 0.10%, preferably 0.05%. The paste is diluted under high shear in an homogenizer to a pumpable dispersion of below 30% total solids content, preferably 20–30%. This dispersion is suitable for spray-drying in a Niro spray-dryer manufactured by Niro Atomizer Copenhagen, Denmark at an outlet temperature of 75° C. and an inlet temperature of 135° C. The powder is a free-flowing, readily dispersible powder with improved smoothness and flavor. The powder can be used to improve full fat and low fat products such as a dry beverage mix, instant dessert mix, and confections.

This invention will now be described by reference to specific examples. Those skilled in the art of chocolate products will readily see the broad application of the microparticularized cocoa paste to a wide array of food products.

EXAMPLE 1

Approximately 31 lbs. of water and ice at 35° to 40° F. was placed in a large bowl. Into this water, 45 lbs. of sugar was dissolved with stirring, to form a sugar solution. A dry blend of 22 lbs. commercial cocoa powder (having a particle size of about 75 microns and a fat content of 10–12 fat) was then made with 2 lbs. of dry skim milk solids. The cocoa-milk blend was then added to the sugar solution and mixed with an agitator for 10 minutes to form a pumpable slurry.

The grinding took place in a "Dyno-Mill" KD-5 (U.S. Pat. Ser. No. 730,711) wet-mill grinder available from Glen Mills Inc. of 203 Brookdale Street, Maywood, N.J. 07607. The cocoa slurry is pumped through a horizontal grinding chamber filled to 85% capacity with ceramic (zirconium dioxide) beads. Inside the grinding chamber, a rapid rotating shaft (1500 rpm) fitted with specially designed discs drove the beads to rotate at an even more rapid rate. The high shear and impact force of millions of beads pulverized the cocoa particles which were subsequently discharged through a gap or opening in a separator for the beads. The grinding was done at one atmosphere of pressure and a temperature of 50° to 60° C. A uniform and smooth paste with an average mean particle size of between 2 and 7 microns was produced by the Dyno-Mill.

Analysis of the cocoa particles showed a distribution between 0.1 and 20 microns with at least 75% of the particles between 2 and 10 microns. About 10% of the particles were below 2 microns and about 10% above 10 microns. No particles were above 20 microns. The paste had an Aw of 0.86 making it ideal for addition or combination with bakery products which have an Aw of 0.86 to 0.88.

After micromilling in the Dyno-Mill, the normally inert cocoa particles were found to exhibit fat-like or cream-like properties. The paste dispersion imparts a creamy, smooth mouthfeel and can be used as a fat mimetic to partially or fully replace fat. It has a darker color, increased viscosity and better flavor release (chocolate flavor profile similar to a "conched" chocolate) when blended into baked chocolate products, as well as icings and fillings for these bakery products.

Moreover, the paste is shelf-stable, does not solidify (even in a freezer), is spreadable (similar to margarine), has a very shiny or wet look (desirable in chocolate), prevents ice crystal growth, prevents crystallization of sugar in a supersaturated solution, will not disperse in an aqueous system without mechanical force, and does not settle out when blended into an aqueous or milk beverage.

EXAMPLE 2

When 25 lbs. of the same commercial cocoa used in Example 1 was added to 50 lbs. of water and agitated for 10 minutes and pumped into the Dyno-Mill, no product was obtained due to plugging of the mill. It appeared that the cocoa-water slurry in the Dyno Mill became too thick and viscous to be workable. This is believed to be due to the tremendous water absorption properties of the cocoa particles as they are ground to below 10 microns.

At levels of 25 lbs. cocoa and 75 lbs. water, it was possible to obtain a paste product in the Dyno Mill, but at these levels of water (Aw above 0.9), the paste could not be used in cake and bakery food applications since the moisture level and water activity was too high.

EXAMPLE 3

A non fat icing was prepared using the following ingredients.

| Ingredient | Lbs. |
| --- | --- |
| Agar Agar | 2.3 |
| Tapioca Starch | 109.0 |
| Invert Sugar | 245.0 |
| Water | 439.0 |
| Granulated Sugar | 600.0 |
| Sorbate | 2.1 |
| Titanium Dioxide | 0.3 |
| Pea Fiber | 4.0 |
| Non-fat Milk Solids | 4.0 |
| Vanillin | 0.2 |

The above ingredients, except for the pea fiber, milk solids, and vanillin, were simply mixed into a big vat or steam kettle. The mixture was cooked for about 10 minutes until a temperature of 210° F. was reached. The mixture was then allowed to cool down to 160° F. This took about 20 minutes. The icing was then pumped into pails and placed in a refrigerator.

The no fat icing was prepared by using a Glenn 340 planetary head mixer for mixing the various ingredients together. About 200 lbs. of the paste from Example 1 was placed in the bottom of the planetary head mixer bowl. The 8.2 lbs. of pea fiber, non-fat milk solids and vanillin (which act as dry mix stabilizers and flavor) were placed on top of the Example 1 paste. Then 400 lbs. of the above agar-starch icing was added to the bowl. The entire mixture was then mixed for 3-5 minutes at 75 rpm.

The icing had a fat content under 1%. It had an Aw of 0.855 making the icing an ideal spread for a cake crust (which has an Aw of 0.86 to 0.88). Moreover, it had the same attributes of a conventional full fat icing. The icing has a creamy, smooth mouthfeel similar to a full fat icing. It has dramatic stability improvement. The icing is shelf-stable at room temperature for at least fourteen (14) days. It is spoon-spreadable onto a cake and has a darker more shiny, chocolate color.

What is claimed is:

1. A micromilled cocoa paste composition processing improved food modifying properties for chocolate products which comprises hydrated microparticles of cocoa having a particle size of about 0.1 to about 20 microns, said microparticles of cocoa being dispersed in an aqueous sugar solution wherein said cocoa is present from about 10 to about 30 weight percent, sugar from about 15 to about 75 weight percent and water from about 20 to about 55 weight percent.

2. The composition of claim 1 wherein the hydrated cocoa particles have an average mean particle size of about 2 to 7 microns.

3. The composition of claim 1 wherein the aqueous sugar solution contains milk solids.

4. The composition of claim 1 wherein the cocoa composition comprises about 1-5% non-fat milk solids, about 10-30% cocoa, about 15-75% sugar, and about 20-55% water and an Aw of 0.80 to 0.90.

5. The composition of claim 1 wherein the cocoa composition comprises about 1-3% skim milk solids, about 20-25% cocoa, about 40-50% sugar, and about 25-35% water and an Aw of 0.80 to 0.90.

6. The composition of claim 1 wherein the microparticles of cocoa are between about 0.1 and about 10 microns.

7. The composition of claim 1 at an Aw of 0.80 to 0.86 which has extended shelf stability and use as a food modifier in chocolate products.

8. The composition of claim 1 wherein the cocoa composition is added to a chocolate product in an amount ranging from about 10 to about 80 weight percent to modify the functional properties of the chocolate product.

9. A low-fat chocolate icing which comprises sugar, water, a thickener and a micromilled cocoa composition having microparticles of cocoa having a particle size of about 0.1 to about 20 microns, said microparticles of cocoa being dispersed in an aqueous sugar solution wherein said cocoa is present from about 10 to about 30 weight percent, sugar from about 15 to 75 weight percent and water from about 20 to about 55 weight percent.

10. The composition of claim 9 wherein the chocolate product is a low-fat icing containing about 25-50% water, about 5-10% starch and about 45-70% sugar.

11. The composition of claim 10 wherein the low-fat icing comprises about 30-40% water, about 52-62% sugar, about 5-10% tapioca starch and about 0.05-3% hydrocolloid gum.

12. The composition of claim 11 wherein the tapioca starch is about 6-8% and the hydrocolloid gum is about 0.15-0.25 agar agar.

13. A process for improving the functional properties of cocoa powder which comprises:
  forming a slurry of about 10-30% cocoa, about 15-75% sugar and about 20-55% aqueous liquid, said sugar and aqueous liquid being present in the slurry as a sugar solution;
  grinding the hydrated cocoa particles in the slurry to a particle size wherein 100% of the particles are between about 0.1 and about 20 microns thus forming a cocoa composition;
  said cocoa composition being suitable as a food modifier for a chocolate food product.

14. The process of claim 13 wherein the hydrated cocoa particles have an average mean particle size of about 2 to 7 microns.

15. The process of claim 14 wherein the slurry about 20-25% cocoa, about 40-50% sugar, and about 25-35% aqueous liquid and the chocolate food product is an icing.

16. The process of claim 15 wherein the icing is a low-fat icing containing sugar, water and a thickener.

17. The process of claim 16 wherein the icing is a low-fat icing containing about 25-50% water, about 5-10% starch and about 45-70% sugar.

18. The process of claim 17 wherein the non-fat icing comprises about 0.05-0.3% of a hydrocolloid gum.

19. The process of claim 18 wherein the hydrocolloid is agar-agar.

20. The process of claim 19 wherein the no-fat icing comprises about 30-40% water, about 52-62% sugar, about 6-8% tapioca starch, about 0.15-0.25 agar agar, about 0.3-0.4% salt, about 0.1-0.2% sorbate, and color.

21. The process of claim 13 wherein the cocoa composition is added to a chocolate product in an amount effective to modify the functional properties of the chocolate product.

22. A process for producing a 99% fat-free chocolate icing comprising:
dissolving sufficient sugar in water to form a sugar solution of 15 to 75%;
forming a slurry of 1 part (by wt.) cocoa powder and 3-5 parts sugar solution, said slurry containing 1-5% non-fat milk solids;
milling the slurry to obtain a cocoa composition having hydrated cocoa particles of between about 0.1 to about 20 microns and an Aw of 0.83 to 0.90;
providing a low-fat icing mix of about 25-50% water, about 45-70% sugar, about 5-10% starch and about 0.05 to 0.3% agar-agar;
mixing 1 part of the cocoa composition with 1-3 parts of said icing mix to obtain an icing with less than 1% fat, said icing having an Aw of about 0.84 to 0.88.

23. The process of claim 22 wherein the hydrated cocoa particles have an average mean particle size of about 2-7 microns.

24. The process of claim 22 wherein the slurry to be wet-milled comprises about 2% skim milk solids, about 22% cocoa powder, about 45% sugar and about 31% water; the milled slurry paste has an Aw of about 0.86, and the low-fat icing comprises about 35% water, about 57% sugar, about 7% starch, about 0.2% agar agar, about 0.4% salt, and about 0.2% preservative, said icing having an Aw of 0.85 to 0.86.

* * * * *